(12) United States Patent
Long

(10) Patent No.: US 11,648,882 B2
(45) Date of Patent: May 16, 2023

(54) VEHICLE ROOF RACK

(71) Applicant: Lonman Auto Accessories Co., Ltd, Dongguan (CN)

(72) Inventor: Shihu Long, Dongguan (CN)

( * ) Notice: Subject to any disclaimer, the term of this patent is extended or adjusted under 35 U.S.C. 154(b) by 0 days.

(21) Appl. No.: 17/366,037

(22) Filed: Jul. 2, 2021

(65) Prior Publication Data
US 2022/0363201 A1    Nov. 17, 2022

(30) Foreign Application Priority Data

May 12, 2021   (CN) .......................... 202121007754.1

(51) Int. Cl.
*B60R 9/04*            (2006.01)
(52) U.S. Cl.
CPC ....................... *B60R 9/04* (2013.01)
(58) Field of Classification Search
CPC ........... B60R 9/04; B60R 9/045; B60R 9/048; B60R 9/058
See application file for complete search history.

(56) References Cited

U.S. PATENT DOCUMENTS

| | | | |
|---|---|---|---|
| 6,425,508 B1* | 7/2002 | Cole ...................... | B60R 9/045 224/330 |
| 11,279,294 B2* | 3/2022 | Menegazzo ............. | B60R 9/048 |
| 2018/0326915 A1* | 11/2018 | Dickinson ............... | B60R 9/045 |

* cited by examiner

*Primary Examiner* — Corey N Skurdal

(57) ABSTRACT

A vehicle roof rack includes four frames: a front frame, a back frame, a left frame and a right frame. Both the front frame and the back frame are main frames, and an upper end of each of the main frames is connected with a guard bar unit; a plurality of main connecting blocks are connected between the front frame and the back frame or the plurality of main connecting blocks are connected between the left frame and the right frame; a middle portion of an upper end of the each of the main frames is provided with an upper clamping groove, and two ends of the guard bar unit are connected with fixing seats respectively; each of the fixing seats includes a connecting lug, the connecting lug is provided with a connecting hole, the connecting hole is connected with a fixing assembly.

6 Claims, 6 Drawing Sheets

VEHICLE ROOF RACK

CROSS REFERENCE TO THE RELATED APPLICATIONS

This application is based upon and claims priority to Chinese Patent Application No. 202121007754.1 filed on May 12, 2021, the entire contents of which are incorporated herein by reference.

TECHNICAL FIELD

The utility model relates to the technical field of automobile parts and components, in particular to a vehicle roof rack.

BACKGROUND

With improvement of living standard of people, people drive out for a trip more and more frequently and carry more and more luggage. For the convenience of carrying luggage, roofs of many household cars are provided with roof racks through which the luggage is fixed. The luggage is usually fixed via ropes. The vehicle roof rack is usually not provided with guard bars and an automobile jolts in a traveling process on a mountain road particularly, so that luggage fixed to the vehicle roof rack may be relaxed and displace, or even fall off. As far as the vehicle roof rack provided with guard bars is concerned, the guard bars are directly fixed to the vehicle roof rack by way of welding, riveting and the like, so that the vehicle roof rack is inconvenient to detach and cannot be adjusted in position. When a luggage part exceeds the vehicle roof rack, the luggage part cannot be mounted.

SUMMARY

Aiming at defects in the prior art, the utility model aims to provide a vehicle roof rack which is provided with a guard bar. The guard bar can be adjusted in position and is mounted and detached conveniently.

A vehicle roof rack includes four frames: a front frame, a back frame, a left frame and a right frame, wherein both the front frame and the back frame are main frames, and an upper end of each of the main frames are connected with a guard bar unit; a plurality of main connecting blocks are connected between the front frame and the back frame or a plurality of main connecting blocks are connected between the left frame and the right frame, a middle portion of an upper end of each of the main frames is provided with an upper clamping groove, and two ends of the guard bar unit are connected with fixing seats respectively, each of the fixing seats includes a connecting lug, the connecting lug is provided with a connecting hole, the connecting hole is connected with a fixing assembly, the fixing assembly includes a clamping part and a fastener, the clamping part includes a clamping portion and a connecting portion, the connecting portion is connected with the fastener, and the clamping portion is clamped to the upper clamping groove.

Preferably, a cross section of the upper clamping groove is T-shaped or L-shaped or dovetail-shaped.

Several secondary connecting blocks are connected between the left frame and the right frame when the plurality of main connecting blocks are connected between the front frame and the back frame; several secondary connecting blocks are connected between the front frame and the back frame when the plurality of main connecting blocks are connected between the left frame and the right frame; and the secondary connecting blocks are located below the main connecting blocks and abut against the main connecting blocks.

Further, a lower end surface of each of the main connecting blocks is provided with two connecting grooves in a length direction, a U-shaped connecting buckle is arranged between one of the main connecting blocks and a corresponding one of the secondary connecting blocks, connecting sheets extend outwards at two ends of the U-shaped connecting buckle respectively, a middle portion of the U-shaped connecting buckle abuts against the corresponding one of the secondary connecting blocks, and the connecting sheets at the two ends of the U-shaped connecting buckle are located on two sides of the one of the main connecting blocks and are connected to the two connecting grooves correspondingly via fixing assemblies.

Preferably, a cross section of the connecting grooves is T-shaped.

Further, the guard bar unit includes a middle block, two sides of the middle block are connected with turning pieces respectively, two ends of the middle block are provided with plug holes respectively, one end of each of the turning pieces is provided with a plugging block, and the plugging block is inserted into one of the plug holes; an inner side of each of the turning pieces is provided with an opening, each of the fixing seats includes a bottom plate abutting against a lower end surface of one of the turning pieces, connecting plugs extend leftwards and rightwards on the bottom plate, an inner side of the bottom plate is connected with an extension sheet matched with the opening of one of the turning pieces, and the extension sheet is connected with one of the turning pieces via a connector.

Preferably, an inner side of the plugging block is provided with a concave hole, and one end of the extension sheet penetrates through the concave hole and is inserted into the middle block; and the middle block, the extension sheet and the turning piece are correspondingly provided with connecting holes respectively, and the middle block is connected with the extension sheet and the turning pieces via connectors respectively.

Preferably, corner pieces are arranged among the frames and are plugged into the frames.

The utility model has the beneficial effects that as the upper clamping groove is formed in the main frame, and the position of the fixed seat connected with the guard bar units can be adjusted on the upper clamping groove, such that the fixed positions of the guard bar units can be adjusted conveniently, and it is convenient to mount and detach the fixed seat.

MARKS OF DRAWINGS

Figure 1:
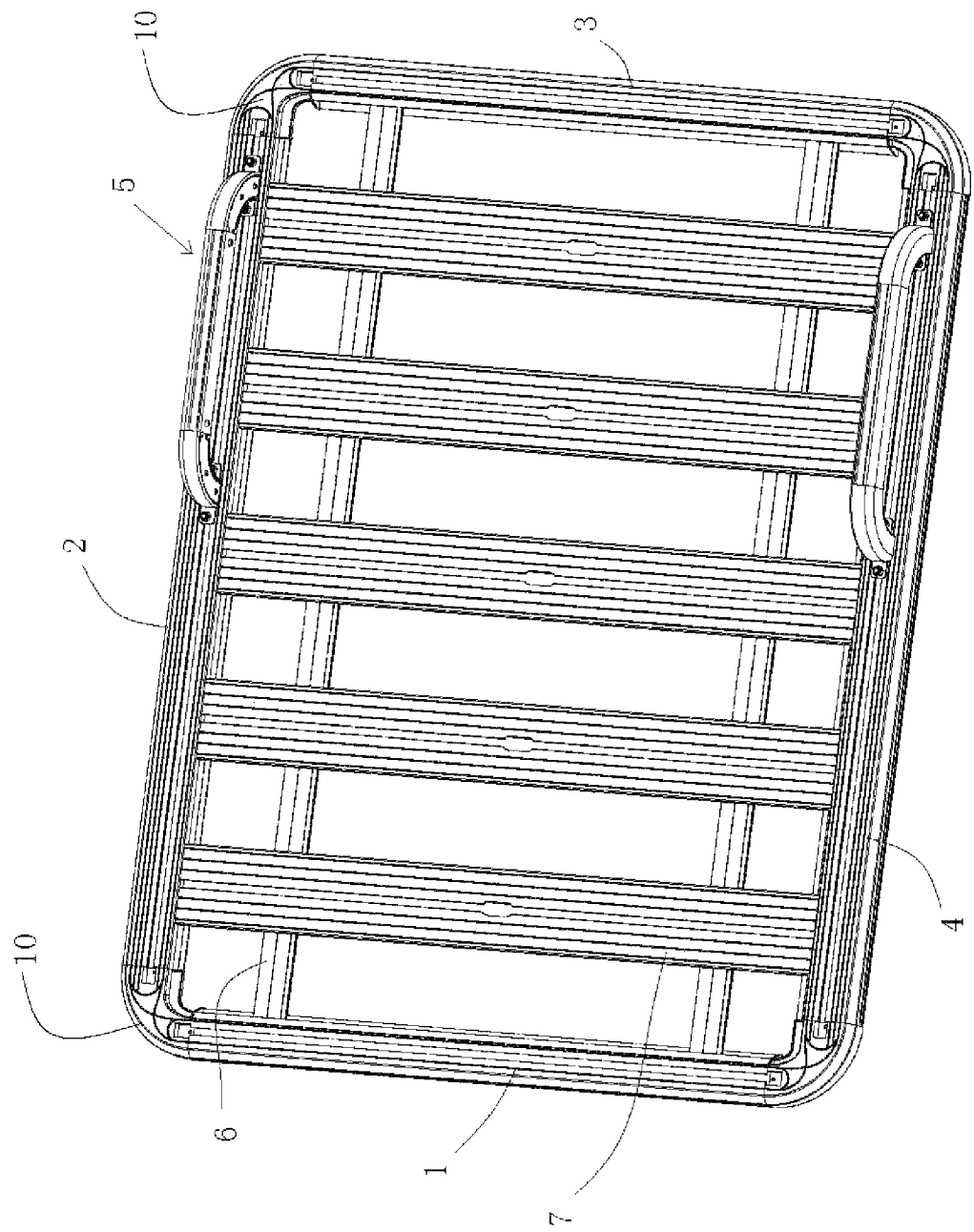
FIG. 1 is a schematic diagram of the embodiment.

1—left frame; 2—front frame; 3—right frame; 4—back frame; 5—guard bar unit; 6—secondary connecting block;

7—main connecting block; 8—fixing assembly; 9—corner piece; 10—U-shaped connecting buckle; 21—upper clamping groove; 31—moving groove; 51—middle block; 52—plug hole; 53—corner piece; 54—plugging block; 55—concave hole; 56—opening; 57—connecting plug; 58—connector; 59—extension sheet; 510—bottom plate; 61—longitudinal clamping groove; 71—main connecting groove; 81—clamping portion; 82—connecting portion; 83—fastener; 91—connecting sheet.

DETAILED DESCRIPTION OF THE EMBODIMENTS

The utility model is described below in details in combination with the accompanying drawings. As shown in FIG. 1 to FIG. 5, Example 1: referring to FIG. 1, FIG. 2 and FIG. 3, a vehicle roof rack includes four frames: a front frame 2, a back frame 4, a left frame 1 and a right frame 3, wherein both the front frame 2 and the back frame 4 are main frames; a plurality of main connecting blocks 7 are connected between the front frame 2 and the back frame 4 or a plurality of main connecting blocks 7 are connected between the left frame 1 and the right frame 3, a middle portion of an upper end of each of the main frames is provided with an upper clamping groove 21, and two ends of the guard bar unit 5 are connected with fixing seats respectively; each of the fixing seats includes a connecting lug 57, the connecting lug 57 is provided with a connecting hole, the connecting hole is connected with a fixing assembly 8, the fixing assembly 8 includes a clamping part and a fastener 83, the clamping part includes a clamping portion 81 capable of moving along the upper clamping groove 21 and a connecting portion 82 penetrating the connecting hole, the connecting portion 82 is connected with the fastener 83, and the clamping portion 81 is clamped to the upper clamping groove 21.

In an actual application, as the upper clamping groove 21 is formed in the middle portion of the upper end of the main frame on each side and the clamping portion 81 of the clamping part can move along the upper clamping groove 21, the position of the clamping part can be adjusted. When the guard bar unit 5 moves, the fastener 83 is loosened first, such that a pressure and a friction force between the clamping portion 81 and the upper clamping groove 21 are reduced. Then, the clamping portion 81 and the guard bar unit 5 are moved. When the clamping portion and the guard bar unit are moved to preset positions, the fastener 83 is connected with the connecting portion 82, and at the moment, the clamping portion 81 abuts against the upper end surface of the upper clamping groove 21. A relatively large pressure is formed between the clamping portion 81 and the upper end surface of the upper clamping groove 21, so that the clamping portion 81 is prevented from moving. During specific arrangement, the cross section of the clamping portion 81 corresponds to the cross section of the upper clamping groove 21 in a laminated state substantially. The fastener 83 can be a nut, and the connecting portion 82 can be a screw. The nut is connected with the screw, such that the clamping groove 81 abuts against the upper end surface of the upper clamping groove 21 and a large pressure is kept. By all means, the fastener 83 can be other parts, for example the connecting portion 82 is provided with a through hole, on end of the fastener is cone-shaped or is a bevel, the end is inserted into the through hole and pushes the connecting portion 82 outwards, so that the clamping portion 81 abuts against the upper end of the upper clamping groove 21 and a large pressure is kept.

Preferably, a cross section of the upper clamping groove 21 is T-shaped or L-shaped or dovetail-shaped.

For the convenience of clamping, the cross section of the upper clamping groove 21 is arranged as a common clamping surface. The T-shaped cross section is used in the embodiment.

Further, several secondary connecting blocks 6 are connected between the left frame 1 and the right frame 2 when the plurality of main connecting blocks 7 are connected between the front frame 2 and the back frame 4; several secondary connecting blocks 6 are connected between the front frame 2 and the back frame 4 when the plurality of main connecting blocks 7 are connected between the left frame 1 and the right frame 3; and the secondary connecting blocks 6 are located below the main connecting blocks 7 and abut against the main connecting blocks 7.

In an application, when cargoes carried by the main connecting blocks 7 are quite heavy, the main connecting blocks have been reached the bearing limit. In order to improve the bearing strength, the secondary connecting blocks 6 are arranged, the secondary connecting blocks 6 abut against the main connecting blocks 7 and the gravity supported by the main connecting blocks 7 is improved.

Figure 4:
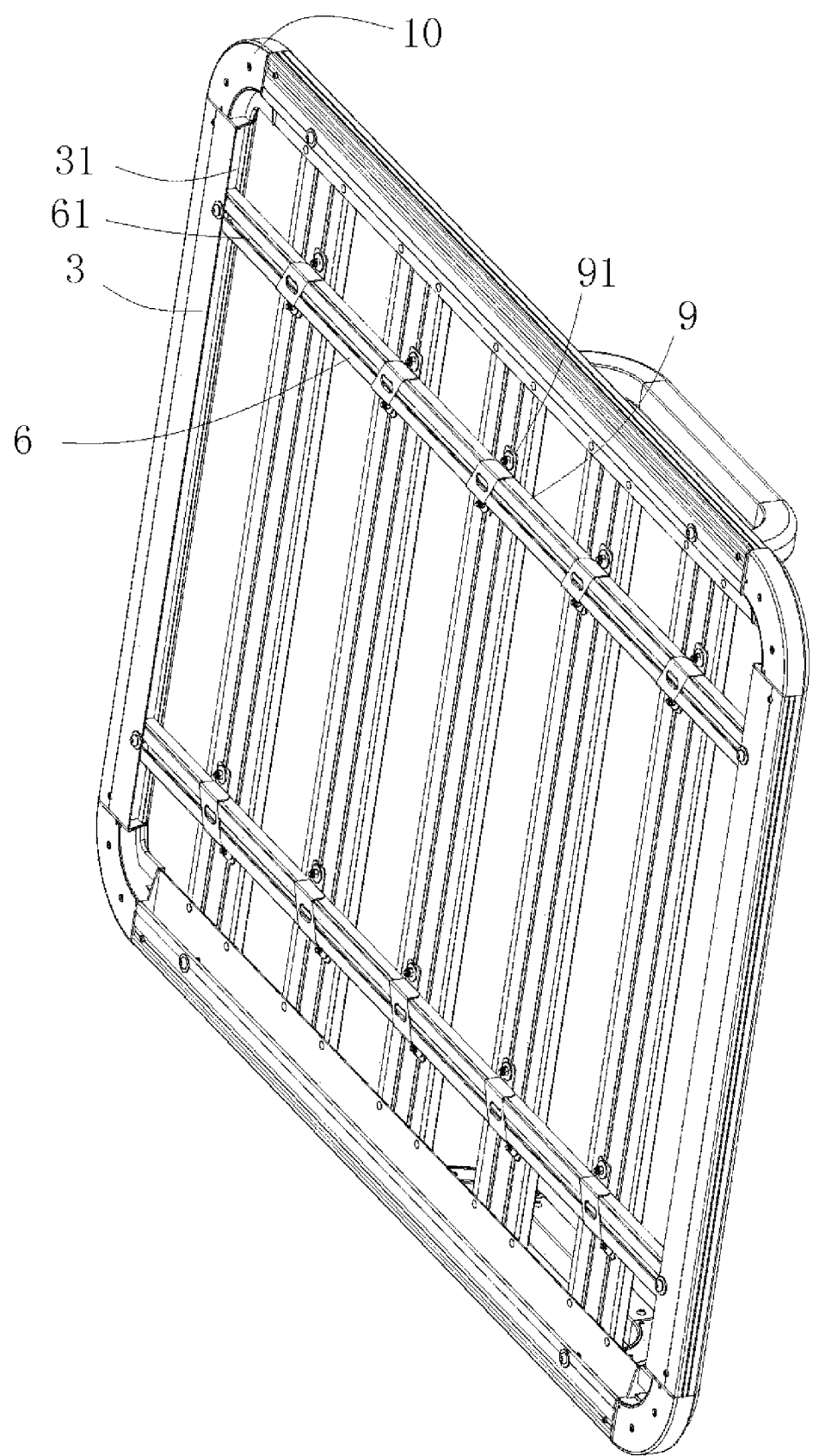
FIG. 4 is a structural schematic diagram of FIG. 1 from another perspective.
Figure 5:
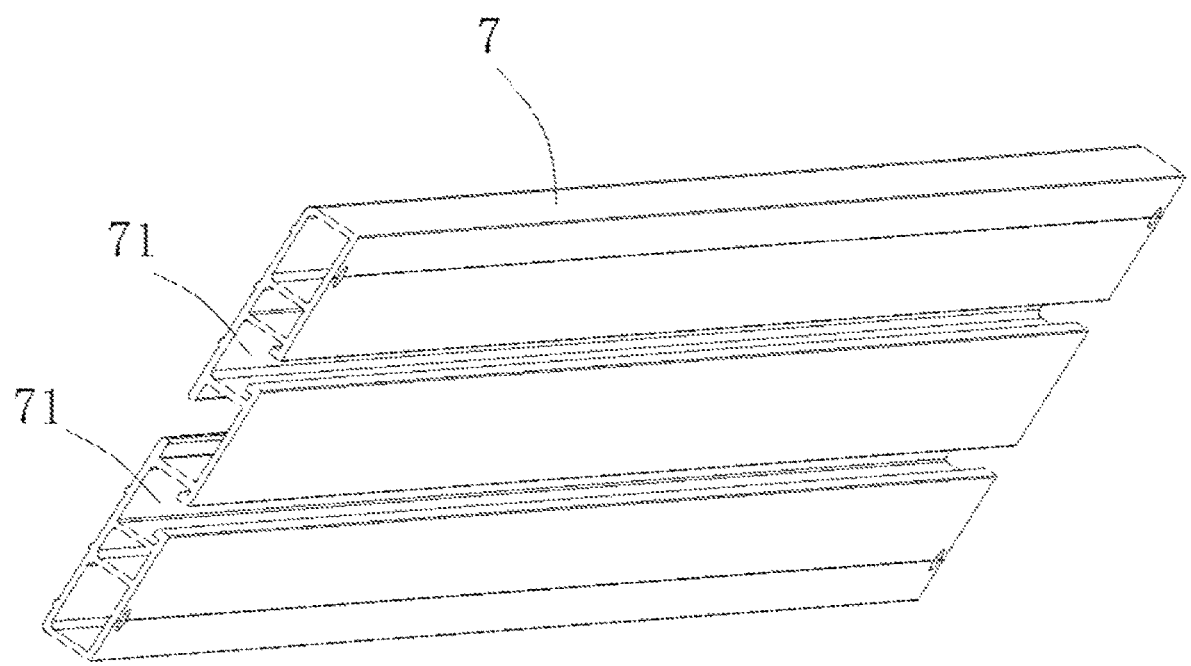
FIG. 5 is a structural schematic diagram of the secondary connecting block.
Figure 6:
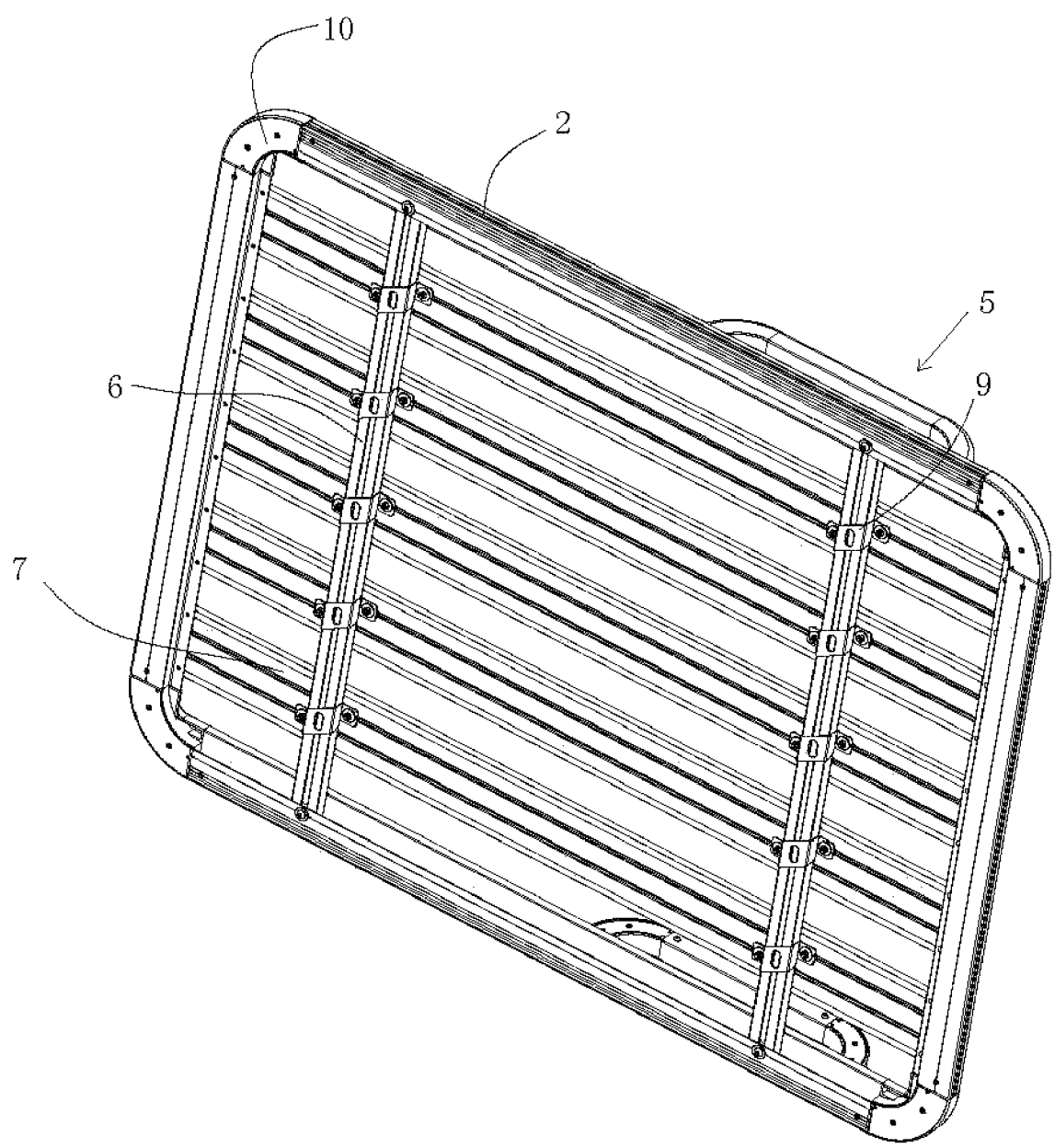
FIG. 6 is another structural schematic diagram of the embodiment.

Referring to FIG. 4, FIG. 5 and FIG. 6, further, a lower end surface of each of the main connecting blocks 7 is provided with two connecting grooves 71 in a length direction, a U-shaped connecting buckle 9 is arranged between one of the main connecting blocks 7 and a corresponding one of the secondary connecting blocks 6, connecting sheets 91 extend outwards at two ends of the U-shaped connecting buckle 9 respectively, a middle portion of the U-shaped connecting buckle 9 abuts against the corresponding one of the secondary connecting blocks 6, and the connecting sheets 91 at the two ends of the U-shaped connecting buckle 9 are located on two sides of the one of the main connecting blocks 7 and are connected to the two connecting grooves correspondingly via fixing assemblies 8.

In the application, the main connecting blocks 7 may be stressed unevenly, and therefore, it is needed to adjust the positions of the secondary connecting blocks 6, such that the secondary connecting blocks 6 correspond to positions, subjected to the gravity greatly, of the main connecting blocks 7. According to the technical scheme, the moving groove is formed in each frame, so that it is convenient to adjust the position of the secondary connecting blocks 6. Second, in order to prevent moving the secondary connecting blocks 6 in use to affect bearing capacity, the secondary connecting grooves are formed in the lower end surfaces of the main connecting blocks and are connected with the secondary connecting blocks 6 through the U-shaped connecting buckles 9 and fix the secondary connecting blocks 6.

Preferably, a cross section of the secondary connecting grooves is T-shaped.

Figure 2:
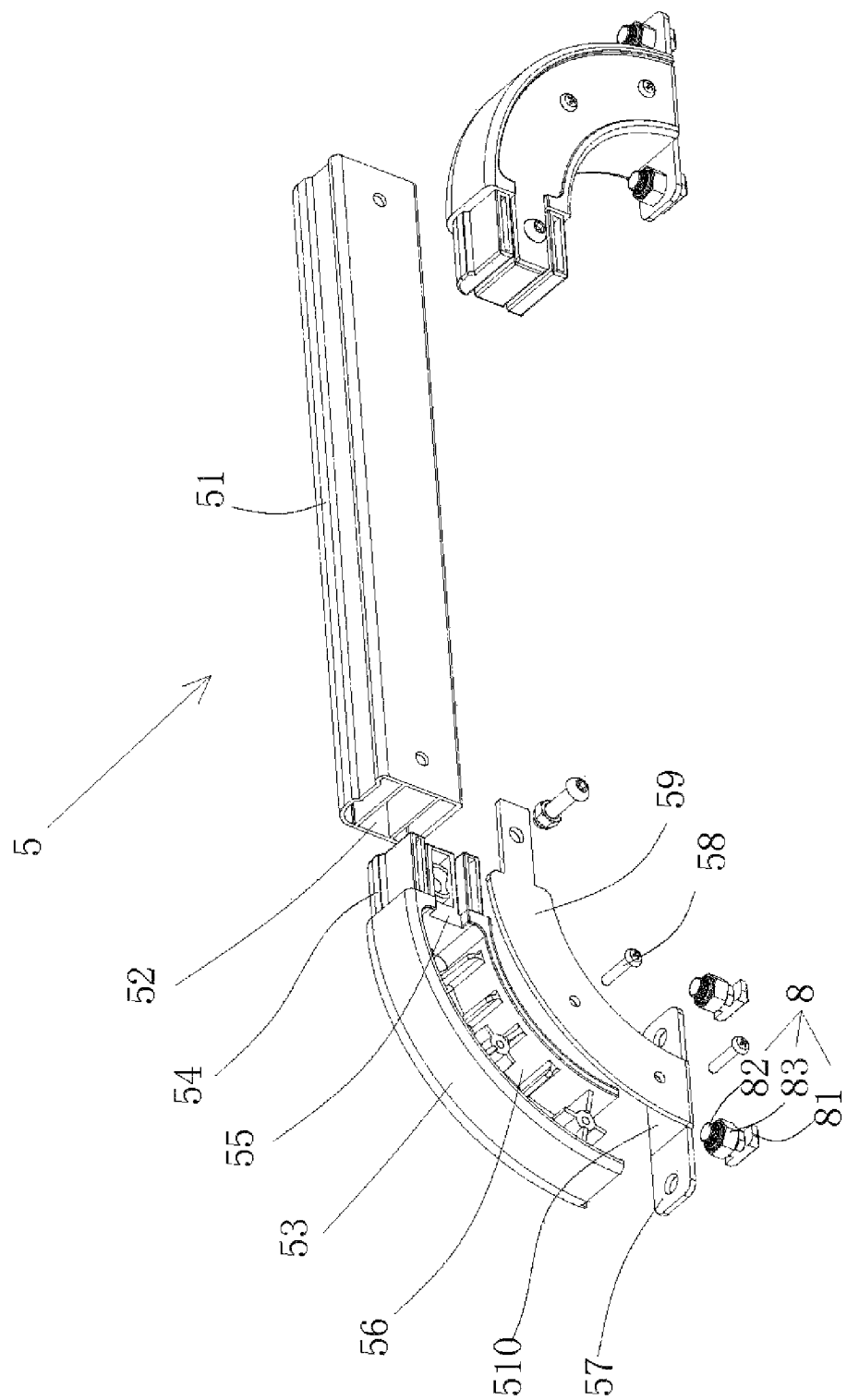
FIG. 2 is a local exploded view of the guard bar unit.
Figure 3:
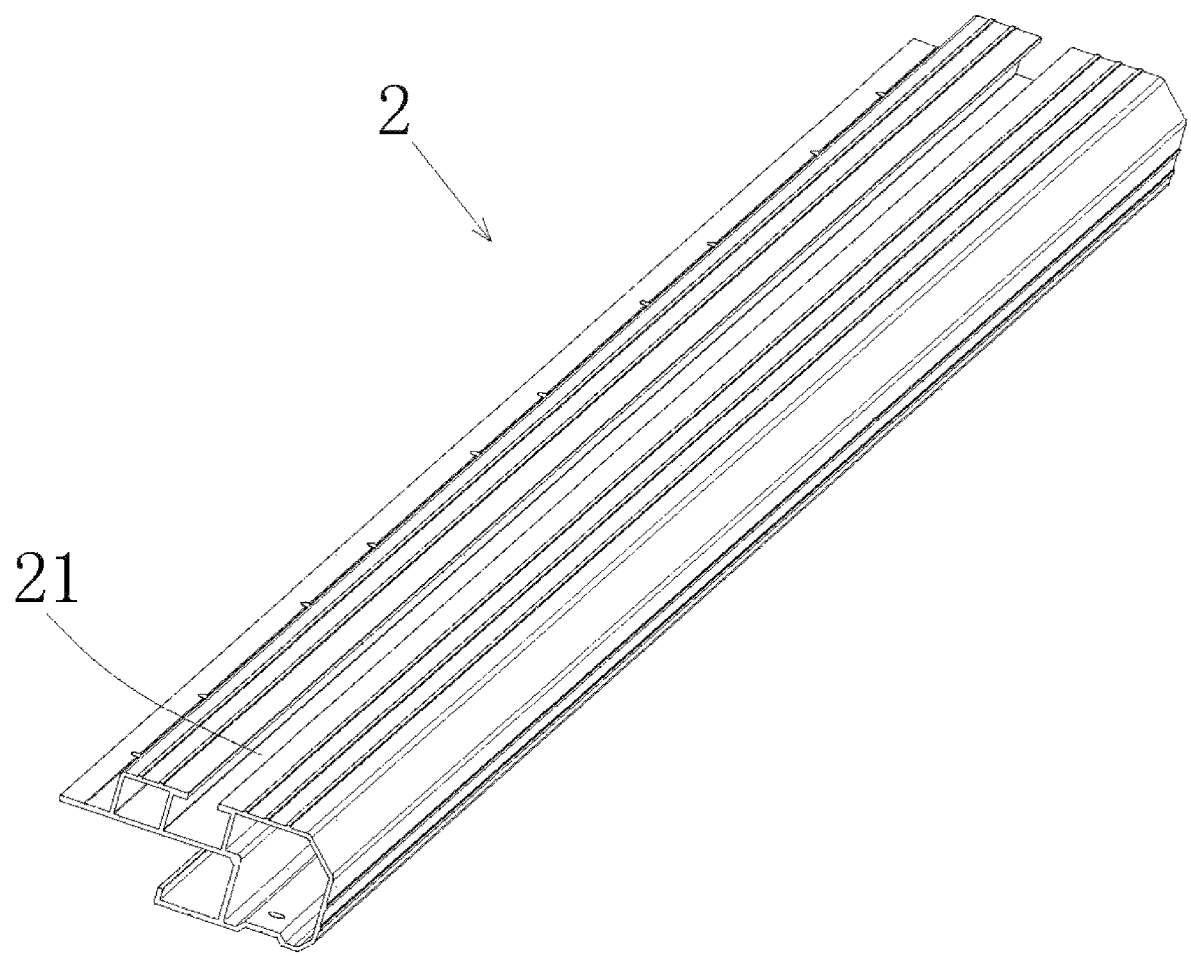
FIG. 3 is a structural schematic diagram of the upper frame.

Further, referring to FIG. 2, further, the guard bar unit 5 includes a middle block 51, two sides of the middle block 51 are connected with turning pieces 53 respectively, two ends of the middle block 51 are provided with plug holes 52 respectively, one end of each of the turning pieces 53 is provided with a plugging block 54, and the plugging block 54 is inserted into one of the plug holes 52; an inner side of each of the turning pieces 53 is provided with an opening 56, each of the fixing seats includes a bottom plate 510 abutting against a lower end surface of one of the turning pieces 53, connecting plugs 57 extend leftwards and rightwards on the bottom plate 510, an inner side of the bottom plate 510 is connected with an extension sheet 59 matched with the opening of one of the turning pieces 53, and the extension sheet 59 is connected with one of the turning pieces 53 via a connector 58.

In specific use, in order to mount and adjust the length of the guard bar unit 5 conveniently, the guard bar unit 5 is designed with three portions: the middle block 51 in the middle portion and the turning pieces 53 on two sides. The turning pieces 53 and the middle block 51 are in a plugging connecting mode, the turning pieces 53 are connected with the fixing seat via the connectors 58, the connectors 58 are bolts, screws and the like, and the connecting lug 57 of the fixing seat is connected with the main frame via the fixing assembly 8. The turning pieces 53 can be either arc-shaped or L-shaped.

Preferably, an inner side of the plugging block 54 is provided with a concave hole 55, and one end of the extension sheet 59 penetrates through the concave hole 55 and is inserted into the middle block 51; and the middle block 51, the extension sheet 59 and the turning piece 53 are correspondingly provided with connecting holes respectively, and the middle block 51 is connected with the extension sheet 59 and the turning pieces 53 via connectors 58 respectively In order to prevent the middle block 51 from being loosened, the middle block 51, the extension sheet 59 and the turning piece 53 are fixedly connected via the connectors 58. In specific arrangement, the connectors 58 can be bolts, the connecting holes of the turning pieces 53 are threaded holes, and screws of the bolts penetrate through the connecting holes of the middle block 51 and the extension sheet 59 and are in threaded connection with the turning pieces 53.

Preferably, corner pieces 10 are arranged among the frames and are plugged into the frames.

By arranging the corner pieces 10, it is convenient to connect the frames and it is further convenient to process the frames.

The above mentioned is only the preferred embodiment of the utility model. For those skilled in the art, variations will be made in specific embodiments and application range in terms of concept of the utility model. The content in the description shall not be construed as limitations to the utility model.

What is claimed is:

1. A vehicle roof rack, comprising four frames, wherein the four frames are a front frame, a back frame, a left frame and a right frame, both the front frame and the back frame are main frames, and an upper end of each of the main frames is connected with a guard bar unit; a plurality of main connecting blocks are connected between the front frame and the back frame, or the plurality of main connecting blocks are connected between the left frame and the right frame, wherein a middle portion of the upper end of the each of the main frames is provided with an upper clamping groove, two ends of the guard bar unit are connected with fixing seats respectively, each of the fixing seats comprises a connecting lug, the connecting lug is provided with a connecting hole, the connecting hole is connected with a fixing assembly, the fixing assembly comprises a clamping part and a fastener, the clamping part comprises a clamping portion capable of moving along the upper clamping groove and a connecting portion penetrating the connecting hole, the connecting portion is connected with the fastener, and the clamping portion is clamped to the upper clamping groove;
wherein a plurality of secondary connecting blocks are connected between the left frame and the right frame when the plurality of main connecting blocks are connected between the front frame and the back frame; the plurality of secondary connecting blocks are connected between the front frame and the back frame when the plurality of main connecting blocks are connected between the left frame and the right frame; and the plurality of secondary connecting blocks are located below the plurality of main connecting blocks and abut against the plurality of main connecting blocks;
wherein a lower end surface of each of the plurality of main connecting blocks is provided with two connecting grooves in a length direction, a U-shaped connecting buckle is arranged between one of the plurality of main connecting blocks and a corresponding one of the plurality of secondary connecting blocks, connecting sheets extend outwards at two ends of the U-shaped connecting buckle respectively, a middle portion of the U-shaped connecting buckle abuts against the corresponding one of the plurality of secondary connecting blocks, and the connecting sheets at the two ends of the U-shaped connecting buckle are located on two sides of the one of the plurality of main connecting blocks and the connecting sheets are connected to the two connecting grooves correspondingly via fixing assemblies.

2. The vehicle roof rack according to claim 1, wherein a cross section of the upper clamping groove is T-shaped or L-shaped or dovetail-shaped.

3. The vehicle roof rack according to claim 1, wherein a cross section of the two connecting grooves is T-shaped.

4. The vehicle roof rack according to claim 1, wherein the guard bar unit comprises a middle block, two sides of the middle block are connected with turning pieces respectively, two ends of the middle block are provided with plug holes respectively, one end of each of the turning pieces is provided with a plugging block, the plugging block is inserted into one of the plug holes, an inner side of the each of the turning pieces is provided with an opening, the each of the fixing seats comprises a bottom plate abutting against a lower end surface of one of the turning pieces, connecting plugs extend leftwards and rightwards on the bottom plate, an inner side of the bottom plate is connected with an extension sheet matched with the opening of the each of the turning pieces, and the extension sheet is connected with the one of the turning pieces via a connector.

5. The vehicle roof rack according to claim 4, wherein an inner side of the plugging block is provided with a concave hole, one end of the extension sheet penetrates through the concave hole and the one end of the extension sheet is inserted into the middle block, the middle block, the extension sheet and the each of the turning pieces are correspondingly provided with connecting holes respectively, and the middle block is connected with the extension sheet and the turning pieces via connectors respectively.

6. The vehicle roof rack according to claim 1, wherein corner pieces are arranged among the four frames and the corner pieces are plugged into the four frames.

* * * * *